8951X
J. Clark,
Vegetable Cutter.
Patented July 7. 1835.
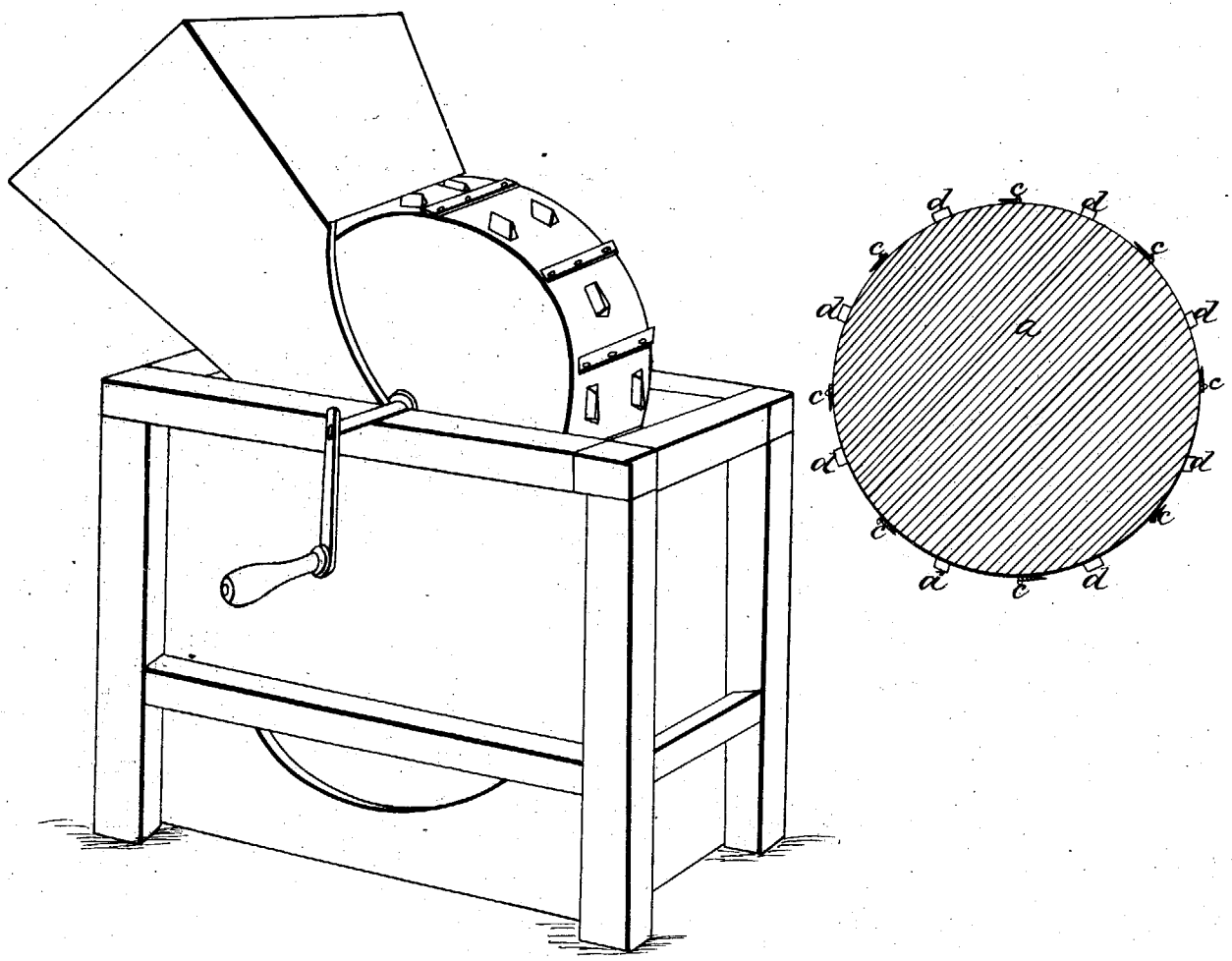

Jonathan Clark of Hampton Conn.

Letters Patent

The schedule referred to in these Letters Patent and making part of the same
Containing a description in the words of the said Jonathan Clark himself of
his improvement in Cutting potatoes Carrots ruta baga. Mangel Wort
-zell & other vegetables & called the Revolving Esculent Root Cutter.

To all People to whom these presents shall come Be it known that I Jonathan
Clark of Hampton in the County of Windham & State of Connecticut
having invented a new and useful Machine for Cutting potatoes Carrots
Mangel Wortzel ruta baga & other vegetables used for the feeding of Cattle
horses Sheep &c. as well as for the Cutting of Apples & other uses called the
revolving esculent root cutter and that the following is a full and exact de
-scription of the construction and operation of the sd Machine as invented by
me. This Machine for cutting potatoes Carrots. ruta baga Mangel Wort
-zel and other vegetables used for the feeding of Cattle horses Sheep &c as
well as for the Cutting of Apples & other uses Called the revolving esculent
root Cutter is constructed in the following Manner viz. It is supported by
a frame — one of a common size is about four feet long about one foot three
inches wide three feet high exclusive of the hopper which extends about
five inches above sd frame formed in such manner as to contain a
revolving Cylinder either solid or hollow about two feet in diameter
and about nine inches wide turned by hand water Steam or any other way
which may be found most convenient and the whole of said Machine
may be varied in size as the wants of the operator may require, To the
Circumference of sd Cylinder is attached one two or more cutting knives
placed diagonally or at right angles across sd circumference either fixed
or moveable so as to cut whatever is applied coarse or fine as may
be required. Also may be placed on the circumference of sd Cylinder
as many slitting knives to cut as fine as may be wished. Sd
knives are set placed in wood metal or any substance sufficient to support

[illegible]

8951X them and so attached by dove tail screws or otherwise removable at pleasure
so as to cut without any difference, that is may have as many of sd
Slitting knives set as necessity may require and of such length as may
suit convenience. The Shaft or Axle of Said Cylinder may be made mo-
veable back or forward as the variation of Said Cutting knives may
require, either by screws or any other way most convenient which by put-
ting sd Cylinder in motion will cause to be cut whatever is placed in
the hopper into such parts as may be wished according to the placing of
sd knives. The hopper is so constructed as to let whatever is applied to it
slide or roll against the cylinder where it passes the knives & is convey[illegible]
into some vessel under sd machine which receives the same when
cut. The box or covering of the frame and Cylinder is so constructed as
to be easily separated at the axle for the adjustment of the knives. What
I claim as my own invention & not previously known in the above de-
scribed machine is the application of knives or cutters to a wheel
which in its revolution will cause potatoes & other vegetables to be
cut into any size required in a much more expeditious manner
& with less labor than any other method before known. In testimony
that the above is a true specification of my sd machine as above
described I have hereunto set my hand the 21st day of May AD 18[illegible]

Witnesses
Joseph [illegible]
Andrew I Butkley

Jonathan Clark

[650 [illegible]